Jan. 13, 1959

M. J. KEOHANE 2,868,892

GRAMOPHONE PICK-UPS

Filed Oct. 22, 1954

INVENTOR
Maurice James Keohane
BY [signature]
ATTORNEY

United States Patent Office 2,868,892

Patented Jan. 13, 1959

2,868,892

GRAMOPHONE PICK-UPS

Maurice James Keohane, Caterham, England

Application October 22, 1954, Serial No. 463,940

5 Claims. (Cl. 179—100.41)

This invention relates to electric pick-ups of the magnetic type for gramophones. Its purpose is the production of a pick-up of light weight, which will impose little wear upon records and will give faithful reproduction over a wide range of frequencies without significant resonance at any frequency within the range.

To achieve these ends it is necessary that the mass impedance of the stylus shall be small in order that its resonance with the spring impedance of the record may be above the useful range of reproduction; while the spring impedance of the stylus must be small, or in other words its compliance large, in order that its resonance with the mass impedance of the tone arm may be below the useful range of frequencies.

A further purpose of the invention is the production of a two stylus pick-up in which each stylus vibrates wholly independently of the other, and either stylus can be presented to the record by mere turning of the pick-up in the tone arm through 180°.

With these ends in view one object of the invention is a pick-up comprising a two part moulding, the parts abutting face to face and presenting recesses extending from their abutting faces, in and by which recesses a permanent magnet and two cored coils are positioned with their axes parallel, so producing on each of two opposite sides of the pick-up a magnetic field in which a stylus-carrying armature structure can vibrate so as to cause a ripple in the flux threading each coil.

A further object of the invention is an armature structure and arrangement including a leaf spring of low Young's modulus anchored upon the body of the pick-up and carrying a short, light and stiff armature of magnetic material in which a stylus is set, the armature extending from the neighbourhood of a pole of a permanent magnet towards and between two cored coils.

These and other objects of the invention are more particularly pointed out in the claims which follow this description.

A pick-up embodying the invention is shown in the drawings of this specification.

Figures 1, 2, 3, 4, 5, 6, 7, 8, 9, 10, 11, 12:
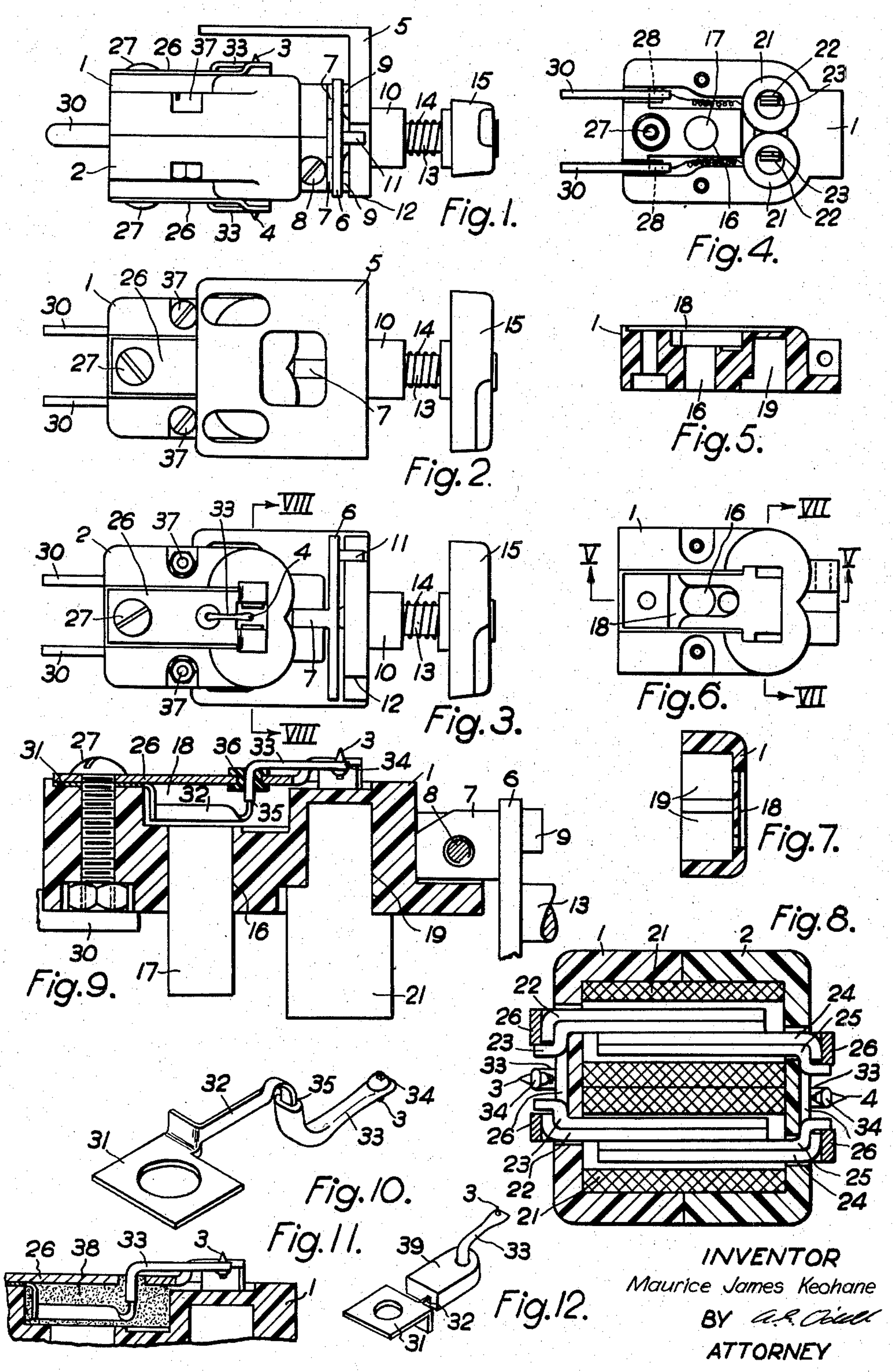
Figures 1, 2 and 3 are an elevation, a plan and an inverted plan of it.
Figure 4 is an inverted plan of one half of the pick-up moulding.
Figure 5 is an elevation of it on the line V—V of Figure 6.

Figure 6 a plan of it after removal of all other parts of the pick-up, and

Figure 7 a cross-section on the line VII—VII of Figure 6;

Figure 8 is an enlarged cross-section of the pick-up on the line VIII—VIII of Figure 3, and Figure 9 an enlarged elevation of one half of it in median section;

Figure 10 shows the stylus structure by itself.

Figures 11 and 12 shows alternative means for damping the stylus movement.

The pick-up is built in a two-part moulding, 1, 2 of plastic, for example polystyrene. It presents two stylus points, 3, 4, for example of sapphire, one on each of two opposite sides of the pick-up. These may conveniently be designed in known manner for playing records of different kinds, for example one of .002 to .003" radius for records on shellac and one of .001" radius for records on polyvinylchloride. In order that either stylus may be brought into contact with a record as desired the pick-up is reversibly mounted on an L-shaped bracket 5 adapted for attachment to a tone arm. The mounting comprises a metal plate 6 which has on one side projecting tongues 7 which enter grooves in the mouldings 1, 2 and are secured to them by screws 8, and on the other side nipples 9 which can engage in recesses in the bracket 5 in either the position shown in Figure 1 or in a position 180° from that shown, and also a stud 11 which moves over a semi-circular surface 12 upon the bracket 5 and is confined within a little more than 180° of movement by shoulders on the bracket at the ends of the semi-circular surface. To the plate 6 there is attached a spindle 13 which extends through a boss 10 on the bracket 5; a spring 14 surrounds its protruding part and is compressed between the bracket 5 and a thumb-piece 15 attached to the spindle. Pressure on the thumb-piece displaces the nipples 9 from the recesses in the bracket 5, and rotation of the thumb-piece turns the pick-up over.

The magnetic circuit of the pick-up is built up as follows. There is fitted into a cylindrical tunnel 16 extending to the inner faces of both mouldings 1, 2 a permanent magnet 17. At its outer ends the tunnel 16 opens into recesses 18 on the outer faces of the mouldings 1, 2, designed to receive the resilient stylus support described below. In cylindrical recesses 19 in the near faces of the mouldings, the recesses joining in the middle, are fitted magnet windings 21. Each coil of the windings has a laminated core best seen in Figure 8. As shown each core comprises two pairs of strips 22, 23 and 24, 25 one inserted from one end of the coil, the other from the other end. As seen in Figure 8 the strip 22 is bent to engage over and retain the strip 23, and the latter is doubly bent and projects beyond the strip 22; the same applies to the strips 24 and 25. All the strips are secured in position in their coils by non-magnetic stampings 26 fastened by screws 27 in the recess 18 of the mouldings 1 and 2. The ends of the magnet windings 21 are connected to plugs or connecting strips 30 which lie in recesses in the abutting rear faces of the mouldings 1, 2, and are retained against being pulled out by lugs on their ends entering deeper recesses 28 in the mouldings. It will be seen that there are considerable air gaps between the ends of the cores 22—25 and the adjacent ends of the magnet 17; these are bridged only in part by the armature structure.

The armature structure comprises a resilient mounting strip, shown as a stamping of a copper-beryllium alloy, the form of which is best seen in Figure 10. Its square end 31 rests in the shallow end of the recess 18 in the outer face of the moulding and is there secured by the screw 27 clamping the stamping 26 upon it; its narrow strip 32 is twisted through a right angle at its end and bent outward. A wire 33 of soft iron is flattened and perforated at one end as seen at 34 and a rubber tube 36, not shown in Figure 10, is threaded upon it; a pointed cylinder of sapphire or like stylus material (3 or 4) is passed through the perforation and secured with shellac. The wire is bent through a right angle as shown and its other end 35 is bored lengthwise to receive the end of the strip 32; after insertion of the strip the end 35 is closed or crimped upon it.

In assembly, after the coils 21, plugs 30, and the permanent magnet 17 have been put in place, the two mouldings 1 and 2 are secured together by screws 37. Then the cores 22—25 are inserted through the moulding into the coils, and the armature strip 33 is passed through an opening in the stamping 26, in which opening the rubber tube 36 is a close fit. The stampings 26 are then set in position in the mouldings and secured, so securing in turn the magnet cores. The assembly can then be attached to the plate 6. In use the stylus 3 (or 4) is oscillated by the record, the strip 32 yielding resiliently, and a ripple is imposed upon the magnetic flux threading the coils 21. The movement is damped by the rubber tube 36. The stylus not in use takes no part in the movement so neither its mass nor its compliance affect the action.

A copper-beryllium alloy is chosen for the spring mounting because of its low modulus of elasticity. The armature proper is short and therefore stiff, and also light. The armature mass and copper-beryllium spring resonate at a medium frequency, say of the order of three kilocycles per second; above this frequency the effective mass of the composite cantilever armature structure tends towards the mass of the armature proper alone; so the structure combines high compliance at low frequencies with small mass at high frequencies.

In lieu of the tube 36 damping may be effected by filling the recesses 18 with a silicon grease as indicated at 38 in Figure 11. Or, in lieu of the tube 36, a moulded block of rubber 39 may be employed as shown in Figure 12, the part 32 of the stylus lying in a recess in the block and a part 33 passing through the block.

I claim:

1. An electric pick-up comprising a two part moulding, the parts abutting face to face and each part having recesses extending from its abutting face, a pair of coils and a permanent magnet fitting and positioned by the recesses in the moulding with their axes parallel, laminated cores inserted through openings in the moulding into said coils, one lamination in each coil being bent at one end to lock the remaining laminations in position at that end and another lamination being bent at the other end to lock the remaining laminations in position at that other end, two other laminations projecting beyond the locking laminations at one end and two further laminations projecting beyond the locking lamination at the other end, a resiliently mounted armature extending from said permanent magnet towards said cores, and a stamping on each outer face of the moulding secured to the moulding and clamping the resilient mounting of the armature and the laminations of the cores in position.

2. An electric pick-up comprising a plastic moulding made in two similar parts abutting face to face on the mid plane of the pick-up, both parts having like interior recesses extending from their abutting faces, a pair of coils and a permanent magnet each lodged in and positioned by corresponding recesses in each part of the moulding with their axes at right angles to the abutting faces of said parts, laminated cores inserted through openings in the two parts into said coils, said two parts having also like exterior recesses in their outer faces, a stamping located in and covering each said exterior recess, and fastened to the moulding part, an armature structure on the outer face of each part comprising a resilient support located within the exterior recess of said part and a magnetic portion carrying a stylus, each said stamping covering the resilient support of an armature structure, and clamping said armature structure and said laminated cores in position.

3. An electric pick-up comprising a two part moulding, the parts abutting face to face and having like recesses extending from their abutting faces, a pair of coils and a permanent magnet each fitting and positioned by corresponding recesses in the two parts, and soft iron cores in said coils, said moulding parts also having like recesses in their outer faces, an apertured stamping on the outer face of each part located and secured in the recess in that face, and an armature structure passing through the opening in said stamping and comprising a resilient portion lying in the recess beneath the stamping and secured with the stamping and a magnetic portion lying in the magnetic field between said permanent magnet and said cores and carrying a stylus.

4. An electric pick-up comprising a two part moulding, the parts abutting face to face and having like recesses extending from their abutting faces, a pair of coils and a permanent magnet each fitting and positioned by corresponding recesses in the two parts, and soft iron cores in said coils, said moulding parts also having like recesses in their outer faces, an apertured stamping on the outer face of each part located and secured in the recess in that face, an armature structure passing through the opening in said stamping and comprising a resilient portion lying in the recess beneath the stamping and secured with the stamping and a magnetic portion lying in the magnetic field between said permanent magnet and said cores and carrying a stylus, and damping material filling said opening around the armature structure.

5. An electric pick-up comprising a plastic moulding made in two similar parts abutting face to face on the mid plane of the pick-up, both parts having like interior recesses extending from their abutting faces, a pair of coils and a permanent magnet each lodged in and positioned by corresponding recesses in each part of the moulding with their axes at right angles to the abutting faces of said parts, laminated cores inserted through openings in the two parts into said coils, an armature structure on the outer face of each part comprising a resilient portion and a magnetic portion carrying a stylus, a stamping secured on the outer face of each part clamping the resilient portion of the armature structure and the laminated cores in position, a bracket for attachment to a tone arm, and means for attaching said pick-up to said bracket permitting it to be turned through 180 degrees to present one or other stylus to a record.

References Cited in the file of this patent

UNITED STATES PATENTS

| | | |
|---|---|---|
| 2,553,492 | Weil | May 15, 1951 |
| 2,554,209 | Miner et al. | May 22, 1951 |
| 2,639,156 | Ward | May 19, 1953 |